(12) United States Patent
Zhang

(10) Patent No.: US 11,739,805 B2
(45) Date of Patent: Aug. 29, 2023

(54) HEAT-DISSIPATING CAR CALIPER COVER

(71) Applicant: Jianping Zhang, Shanghai (CN)

(72) Inventor: Jianping Zhang, Shanghai (CN)

( * ) Notice: Subject to any disclaimer, the term of this patent is extended or adjusted under 35 U.S.C. 154(b) by 0 days.

(21) Appl. No.: 17/528,210

(22) Filed: Nov. 17, 2021

(65) Prior Publication Data
US 2022/0074457 A1 Mar. 10, 2022

Related U.S. Application Data

(63) Continuation of application No. 16/644,173, filed as application No. PCT/CN2019/105076 on Sep. 10, 2019, now Pat. No. 11,359,686.

(30) Foreign Application Priority Data

Aug. 23, 2019 (CN) .......................... 201910786535.9

(51) Int. Cl.
*F16D 65/847* (2006.01)
*F16D 65/00* (2006.01)
*F16D 55/00* (2006.01)

(52) U.S. Cl.
CPC ....... *F16D 65/847* (2013.01); *F16D 65/0081* (2013.01); *F16D 2055/0037* (2013.01); *F16D 2200/003* (2013.01); *F16D 2250/0084* (2013.01)

(58) Field of Classification Search
CPC ........ F16D 65/847; F16D 65/78; F16D 65/84; F16D 65/0031; F16D 65/0081; F16D 55/22; F16D 55/225; F16D 65/0087; F16D 2055/0037; F16D 2200/003; F16D 2250/0084; B32B 3/06
See application file for complete search history.

(56) References Cited

U.S. PATENT DOCUMENTS 9,278,498 B2 * 3/2016 Collura ..................... B32B 3/06
10,962,067 B2 * 3/2021 Park ........................ F16D 55/22
11,359,686 B2 * 6/2022 Zhang ................. F16D 65/0081
(Continued)

FOREIGN PATENT DOCUMENTS

CN 20523671 U * 5/2016
CN 107237845 A * 10/2017
(Continued)

*Primary Examiner* — Pamela Rodriguez
(74) *Attorney, Agent, or Firm* — Bayramoglu Law Offices LLC

(57) ABSTRACT

A fixing structure of an automobile caliper cover is used for fixing a caliper cover body to an automobile caliper. The fixing structure includes a first fixing member and a second fixing member. The first fixing member includes a connection bracket, a first bent portion fixedly connected to the connection bracket, and a second bent portion cooperating with the first bent portion and fixing the connection bracket to the car caliper; and the first bent portion and the second bent portion are fixedly connected; and/or the second fixing member includes a connection bracket and a fixing buckle fixedly connected to the connection bracket, in which the fixing buckle is used for fixing the connection bracket to the automobile caliper. The connection bracket has at least one bent portion to enhance a strength of the connection bracket and facilitate fastening installation of the connection bracket.

6 Claims, 3 Drawing Sheets

(56) References Cited

U.S. PATENT DOCUMENTS

| | | | | |
|---|---|---|---|---|
| 2005/0258008 A1* | 11/2005 | King | ............... | F16D 65/00 |
| | | | | 188/264 R |
| 2018/0010656 A1* | 1/2018 | Barland | ............. | F16D 65/0081 |
| 2018/0080512 A1* | 3/2018 | Barland | ............. | F16D 65/0087 |
| 2018/0119762 A1* | 5/2018 | Smith | ................ | F16D 65/0068 |
| 2018/0231076 A1* | 8/2018 | Choi | ................ | F16D 65/0068 |

FOREIGN PATENT DOCUMENTS

| | | | | |
|---|---|---|---|---|
| CN | 107289045 A | * | 10/2017 | |
| CN | 110985569 A | * | 5/2018 | |
| CN | 10901886 A | * | 5/2019 | |
| KR | 101942683 B1 | * | 1/2019 | |

\* cited by examiner

HEAT-DISSIPATING CAR CALIPER COVER

CROSS REFERENCES TO THE RELATED APPLICATIONS

This application is a continuation application, the U.S. Patent application Number of applicant's parent application is Ser. No. 16/644,173, filed on Mar. 4, 2020, the Patent Number is U.S. Pat. No. 11,359,686, the entire contents of which are incorporated herein by reference.

U.S. patent application Ser. No. 16/644,173 is the national phase entry of International Application No. PCT/CN2019/105076, filed on Sep. 10, 2019, which is based upon and claims priority to Chinese Patent Application No. 201910786535.9, filed on Aug. 23, 2019, the entire contents of which are incorporated herein by reference.

TECHNICAL FIELD

Embodiments of the present application relate to the technical field of car accessories, and in particular to an automobile caliper cover and its fixing structure.

BACKGROUND

With the development of economy, cars also enter every family, and many car owners will refit and replace wheel hubs, however, a brake caliper is mounted on the wheel hub and is thus an important part of the wheel hub. In addition to being replaced by genuine refit brake calipers, the original calipers on the market only have two decorative products: caliper spray painting and caliper cover installation. The caliper spray painting can only add a layer of paint on the original caliper, and the paint will become black under the influence of brake dust for a long time. In addition, paint spraying itself is also very troublesome.

At present, caliper covers on the market are divided into universal calipers and dedicated caliper covers, and the universal caliper cover needs to be glued. If brake pads need to be replaced, detaching the caliper cover will be very difficult, and it is not safe during use. At the same time, it will also affect the heat dissipation of the caliper, and the shape does not match because the original caliper is ever-changing and cannot completely wrap the caliper; and the dedicated car caliper is obtained by punching through an arc-shaped plane die with an aluminum alloy plate, has an arc-shaped plane profile, can cover the original caliper, and is fixed and installed with a buckle. In addition, the existing caliper cover has obvious defects due to the design of a fixed structure: the buckle is too large and too long, a connection bracket is too long, the amount of buckle deformation is large, the amount of bracket deformation is large, and the clamping force of the buckle is insufficient, which easily causes the caliper cover to shake and rub against the wheel hub. The buckle is too large, which will rub against a brake disc, affecting driving safety. Finally, the existing caliper cover has the disadvantage of a poor heat dissipation effect during use.

SUMMARY

To this end, an embodiment of the present application provides an automobile caliper cover and its fixing structure, to enhance the fastening force greatly, to provide necessary security, improves the installation efficiency, fastness and safety of the part of the caliper.

In order to achieve the above object, an embodiment of the present application provides the following technical solution:

A fixing structure of an automobile caliper cover, used for fixing a caliper cover body to an automobile caliper, wherein, the fixing structure comprises a first fixing member and a second fixing member, wherein, the first fixing member comprises a first connection bracket, a first bent portion fixedly connected to the first connection bracket, and a second bent portion cooperating with the first bent portion and fixing the first connection bracket to the automobile caliper; and the first bent portion and the second bent portion are fixedly connected;

the first bent portion is fixed to a three-dimensional folded edge provided on the first connection bracket by rivets, and the three-dimensional folded edge is provided with a hole for a screw to pass through;

the second bent portion has a three-dimensional folded edge provided with a hole for a screw to pass through to cooperate with the hole of the first bent portion, connecting and fixing by a cap screw.

Preferably, each of the first connection bracket and the second connection bracket has at least one bent portion, to enhance a strength of the first connection bracket and a strength of the second connection bracket and facilitate fastening installation of the first connection bracket and the second connection bracket.

Preferably, the fixing buckle of the second fixing member is fixed to the second connection bracket via rivets or another fastener, the fixing buckle has a folded edge, and the second connection bracket catches a gap between brake discs of a caliper bracket by the folded edge, for fixing the second connection bracket on the automobile caliper.

An automobile caliper cover, having a fixing structure. the fixing structure comprises a first fixing member and a second fixing member, wherein, the first fixing member comprises a first connection bracket, a first bent portion fixedly connected to the first connection bracket, and a second bent portion cooperating with the first bent portion and fixing the first connection bracket to the automobile caliper; and the first bent portion and the second bent portion are fixedly connected;

the first bent portion is fixed to a three-dimensional folded edge provided on the first connection bracket by rivets, and the three-dimensional folded edge is provided with a hole for a screw to pass through;

the second bent portion has a three-dimensional folded edge provided with a hole for a screw to pass through to cooperate with the hole of the first bent portion, connecting and fixing by a cap screw.

Preferably, each of the first connection bracket and the second connection bracket has at least one bent portion, to enhance a strength of the first connection bracket and a strength of the second connection bracket and facilitate fastening installation of the first connection bracket and the second connection bracket.

Preferably, the fixing buckle of the second fixing member is fixed to the second connection bracket via rivets or another fastener, the fixing buckle has a folded edge, and the second connection bracket catches a gap between brake discs of a caliper bracket by the folded edge, for fixing the second connection bracket on the automobile caliper.

In an embodiment of the present application, an inner side and an outer side of the first arc-shaped side plate is described relative to arcs on the same plane, the arc near a proximal end of the center of a circle is the inner side, and the arc remote from the center of a circle is the outer side.

The embodiment of the present application has the following advantages:

by providing the heat transmission assembly on the first arc-shaped side plate, the heat-dissipating car caliper cover of the embodiment of the present application can quickly dissipate the heat generated by a piston pump body of the caliper through the elastic pressing sheet and the silicone sheet; the caliper cover body can be firmly fixed to the caliper by the fixing member; and at the same time, the expansion insert being provided on the caliper cover body can adapt to different calipers. The surface of the cover body of the embodiment of the

BRIEF DESCRIPTION OF THE DRAWINGS

To describe the technical solutions in the implementations of the present application or in the prior art more clearly, the following briefly introduces the accompanying drawings required for describing the implementations or the prior art. It is obvious that the drawings in the following description are merely exemplary, and for those of ordinary skill in the art, other implementation drawings would have been derived from the extension according to the provided drawings without involving any inventive effort.

The structures, proportions, sizes and the like depicted in this specification are only used to fit with the content disclosed in the specification for understanding and reading by those skilled in the art, but are not intended to limit the limitation conditions that can be implemented in the present application, and thus have no technically substantive meaning. Any of the modification of structure, the change of proportional relationship or the adjustment of size should fall within the scope covered by the technical content disclosed in the present application without affecting the effects produced and the object achievable by the present application.

In the figures: 100—cover body; 110—first fixing member; 111—first bent portion; 112—second bent portion; 113—screw; 114a,114b—connection bracket; 120—second fixing member; 121—fixing buckle; 130—heat transmission assembly; 131—spring clip; 132—elastic pressing sheet; 140—first arc-shaped side plate; 150—expansion insert; 160—second arc-shaped side plate.

DETAILED DESCRIPTION OF THE EMBODIMENTS

The embodiments of the present application are illustrated below by using the specific embodiments, and those skilled in the art would have readily understood other advantages and effects of the present application from the disclosure of this specification, and it is obvious that the described embodiments are some of the embodiments of the present application rather than all the embodiments. All other embodiments obtained by a person of ordinary skill in the art based on the embodiments of the present application without creative efforts fall within the protection scope of the present application.

Figure 1:
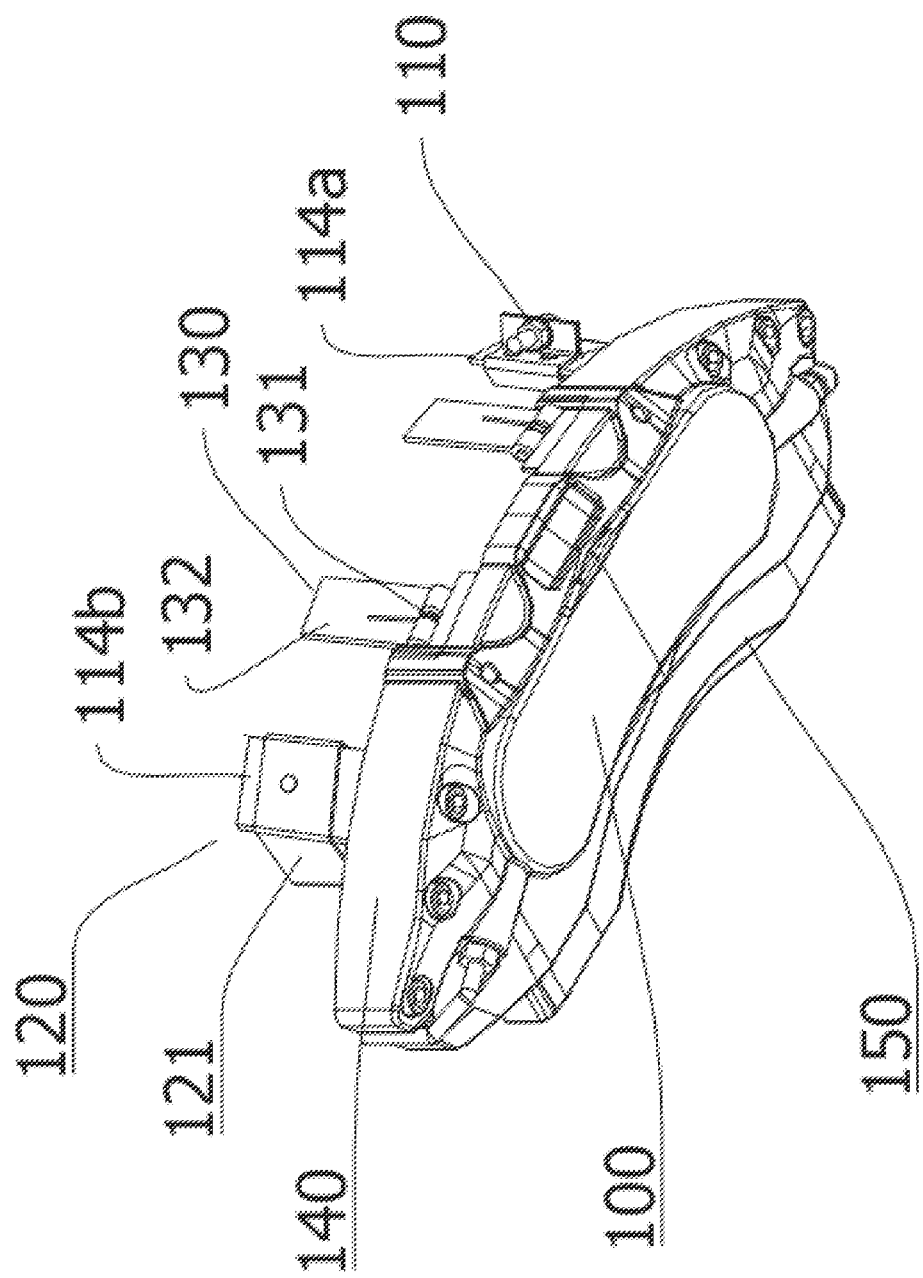
FIG. 1 is a schematic structural diagram of a heat-dissipating car caliper cover provided by an embodiment of the present application.
Figure 2:
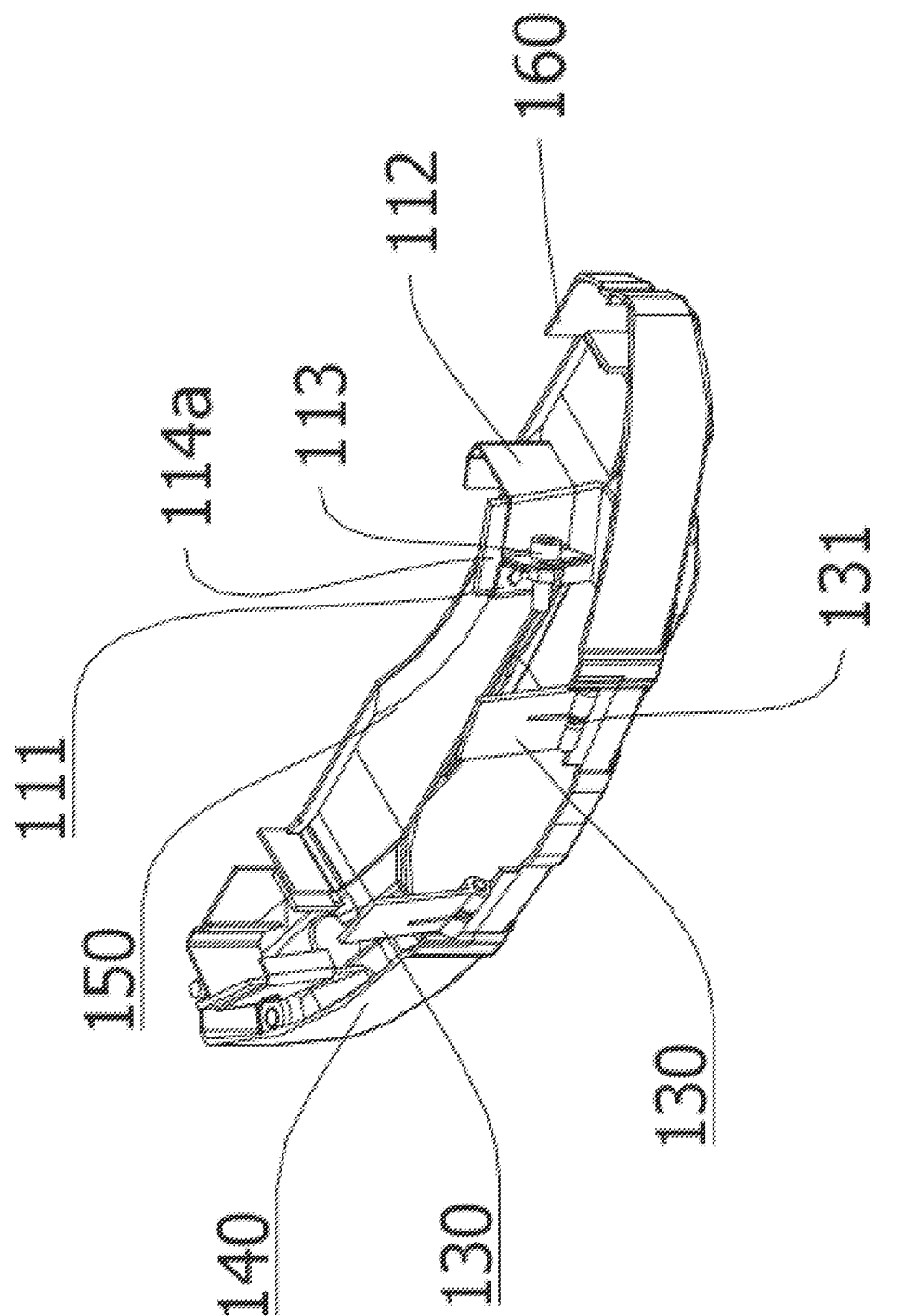
FIG. 2 is a schematic structural diagram of a heat-dissipating car caliper cover provided by an embodiment of the present application from another perspective.

As shown in FIG. 1 and FIG. 2, an embodiment of the present application provides a heat-dissipating car caliper cover, the car caliper cover comprising a cover body 100 and a fixing member for fixing the cover body 100 to a car caliper, wherein a first arc-shaped side plate 140 is provided on an outer side of the cover body 100, a second arc-shaped side plate 160 is provided on an inner side of the cover body 100, the fixing member is provided on the first arc-shaped side plate 140, a heat transmission assembly 130 is provided on the first arc-shaped side plate 140, and the heat transmission assembly 130 comprises an elastic pressing sheet 132 and a silicone sheet provided on the elastic pressing sheet 132; and when the cover body 100 is fixed to the car caliper, the elastic pressing sheet 132 can contact the silicone sheet with a pump body outer side wall of the car caliper, and conducts heat to the cover body 100 for heat dissipation. The elastic pressing sheet 132 is hinged to the first arc-shaped side plate 140, and a spring clip 131 is provided between the elastic pressing sheet 132 and the first arc-shaped side plate 140. Specifically, the elastic pressing sheet 132 is combined with a heat transmission silicone sheet, and the temperature of a piston pump body of the caliper is higher during brake and also requires heat dissipation. In an embodiment of the present invention, through the combination of the elastic pressing sheet 132 and the heat transmission silicone sheet, the caliper cover body 100 is connected to the piston pump body of the caliper, and the high temperature generated by the piston pump body can be quickly transmitted to the caliper cover body 100 through the heat transmission assembly, such that the heat is effectively dissipated, thereby reducing the temperature of the brake caliper. In the heat transmission assembly 130, the heat transmission silicone sheet is combined with the elastic pressing sheet 132, and heat transmission silicone can fill a gap and fully contact with a heating part of the piston pump body. The spring clip 131 is used to ensure pressure required for the connection between the elastic pressing sheet 132 and the car caliper pump body, and when the piston pump body of the car caliper moves slightly due to wear of the brake pads, good pressure and connection performance of the elastic pressing sheet 132 can be maintained, thereby ensuring the continuity and effectiveness of heat dissipation of the car caliper. At the same time, since the cover body 100, the fixing member and the elastic pressing sheet 132 are all made of an aluminum alloy material, the entire car caliper cover has a good heat dissipation performance.

Wherein the fixing member comprises a first fixing member 110 and a second fixing member 120, which are respectively mounted on two sides of the first arc-shaped side plate 140; and the first fixing member 110 comprises a connection bracket 114a, a first bent portion 111 fixedly connected to the connection bracket 114a and a second bent porn on 112 cooperating with the first bent portion 111 and fixing the connection bracket 114a to the car caliper. The second fixing member 120 comprises a connection bracket 114b and a fixing buckle 121 fixedly connected to the connection bracket 114b, the fixing buckle 121 being used for fixing the connection bracket 114b to the car caliper. The first bent portion 111 and the second bent portion 112 are fixedly connected by a bolt. Specifically, the connection bracket 114a/114b is a 2 mm 6061T6 high-strength aluminum alloy plate. The connection bracket 114a/114b has at least one bent portion. Preferably, the connection bracket 114a/114b has two bent portions to enhance the strength of the connection bracket 114a/114b and facilitate joint installation of the connection bracket 114a/114b, and at the same time the heat conducted to the cover body 100 can be dissipated. The first bent portion 111 and the second bent portion 112 are both made of a high-strength stainless steel spring sheet, and the hardness of the spring sheet reaches 400. By the design of the first bent portion 111 and the second bent portion 112, the fastening strength of the fixing member is greatly improved, and the car caliper cover can be firmly mounted on the car caliper.

In an embodiment of the present application, the first fixing member 110 and the second fixing member 120 are provided on the two sides of the first arc-shaped side plate 140, and fixing devices of the two fixing members are different. The first bent portion 111 is fixed to a three-dimensional folded edge provided on the connection bracket 114a by two stainless steel semi-hollow rivets, and the three-dimensional folded edge is provided with a hole for a screw to pass through to fix a hexagon socket head cap screw 113. The second bent portion 112 has a three-dimensional folded edge, which increases the strength of the second bent portion 112, the three-dimensional folded edge is provided with a hole for a screw to pass through to cooperate with the hole of the first bent portion 111, and the hexagon socket head cap screw 113 is used for connection and fixation. The device is simple in structure, firm in fixation, and fast in installation, the caliper cover can be firmly fixed to the caliper only by the hexagon socket head cap screw 113 and a nut, and the problem of deformation and shaking of the caliper cover is minimized. The fixing buckle 121 of the second fixing member 120 is fixed to the connection bracket 114b via two stainless steel semi-hollow rivets, and the connection bracket catches a gap between brake discs of a caliper bracket by the folded edge. The caliper cover is fixed by the first fixing member 110 and the second fixing member 120, and is then fastened by the stainless steel screw 113 and a lock-nut, thus the caliper cover is more safe and reliable, and assembly and disassembly thereof are convenient and cost less time. Since the cover body 100 is entirely made of an aluminum alloy material, and is fixedly connected to the caliper through an aluminum alloy custom connection bracket 114b above the caliper cover, the heat of the caliper can be dissipated through the aluminum alloy caliper cover with a good heat dissipation function.

The surface of the cover body 100 of the embodiment of the present application is coated with a layer of electrostatic powder coating, which has excellent UV and salt mist resistance and corrosion resistance, especially for brake dust, and is particularly convenient in cleaning without discoloration.

Figure 3:
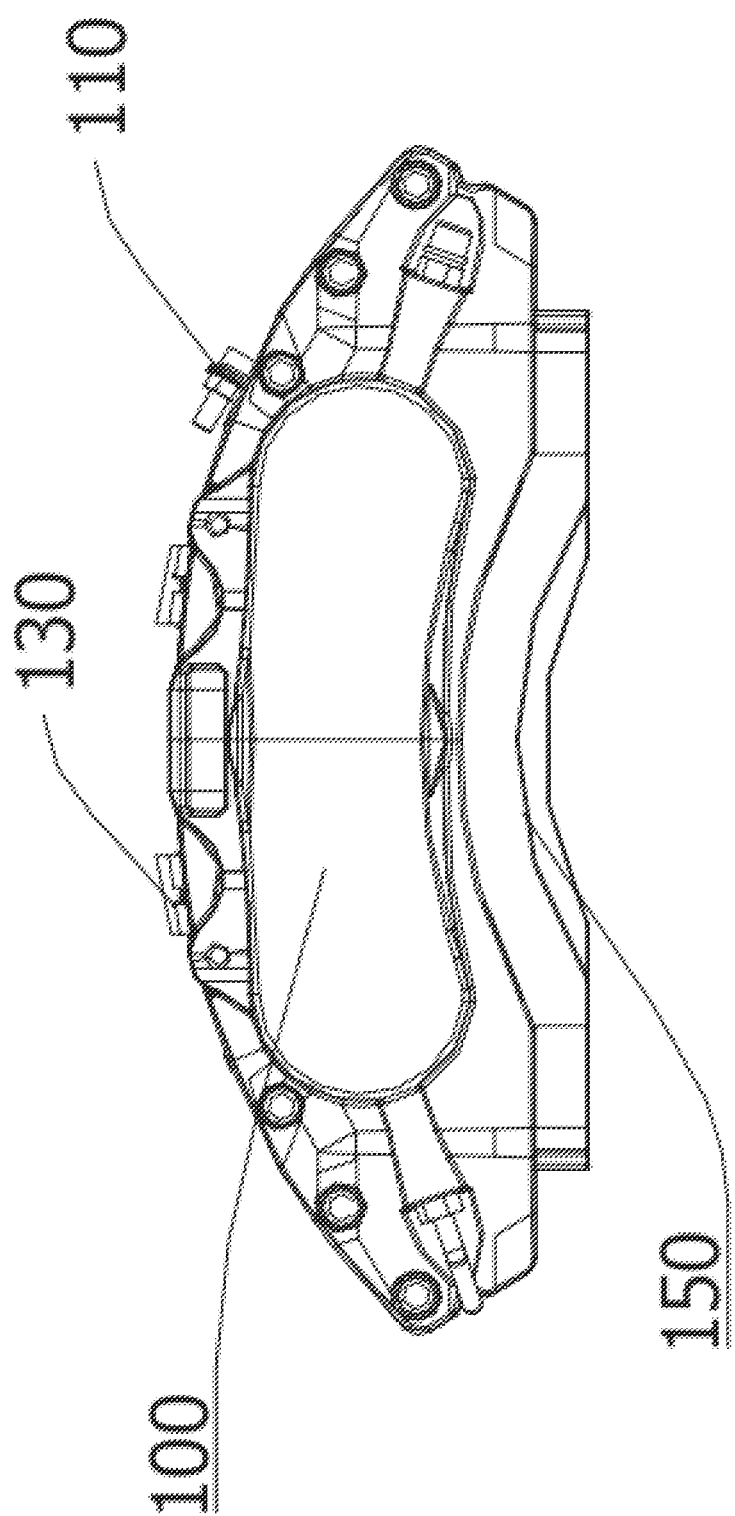
FIG. 3 is a front view of a heat-dissipating car caliper cover provided by an embodiment of the present application.

As shown in FIG. 3, an expansion insert 150 is fixedly connected to the cover body 100 near the second arc-shaped side plate 160. The expansion insert 150 can be designed according to the shape and size of the caliper. By replacing different expansion inserts 150, car calipers of different specifications can be met. The expansion insert 150 can be connected to the cover body 100 in a fixed connection method such as welding, and has a special design for an accommodation space. On the premise of ensuring a three-dimensional effect of the appearance of the cover, the cover has a large accommodation space, which increases mold universality, reduces mold input, and reduces the manufacturing cost of the caliper.

Although the present application has been described in detail above with the general description and particular embodiments, on the basis of the present application, some modifications or improvements can be made thereto, which would have been obvious to those skilled in the art. Therefore, these modifications or improvements made without departing from the spirit of the present application all fall within the scope of protection of the present application.

The invention claimed is:

1. A fixing structure of an automobile caliper cover, used for fixing a caliper cover body to an automobile caliper, wherein, the fixing structure comprises a first fixing member and a second fixing member, wherein,
the first fixing member comprises a first connection bracket, a first bent portion fixedly connected to the first connection bracket, and a second bent portion cooperating with the first bent portion and fixing the first connection bracket to the automobile caliper; and the first bent portion and the second bent portion are fixedly connected;
the first bent portion is fixed to a three-dimensional folded edge provided on the first connection bracket by rivets, and the three-dimensional folded edge is provided with a hole for a screw to pass through;
the second bent portion has a three-dimensional folded edge provided with a hole for a screw to pass through to cooperate with the hole of the first bent portion, connecting and fixing by a cap screw.

2. The fixing structure of claim 1, wherein,
each of the first connection bracket and the second connection bracket has at least one bent portion, to enhance a strength of the first connection bracket and a strength of the second connection bracket and facilitate fastening installation of the first connection bracket and the second connection bracket.

3. The fixing structure of claim 1, wherein, the fixing buckle of the second fixing member is fixed to the second connection bracket via rivets or another fastener, the fixing buckle has a folded edge, and the second connection bracket catches a gap between brake discs of a caliper bracket by the folded edge, for fixing the second connection bracket on the automobile caliper.

4. An automobile caliper cover, comprising the fixing structure of claim 1.

5. The automobile caliper cover of claim 4, wherein,
each of the first connection bracket and the second connection bracket has at least one bent portion, to enhance a strength of the first connection bracket and a strength of the second connection bracket and facilitate fastening installation of the first connection bracket and the second connection bracket.

6. The automobile caliper cover of claim 4, wherein,
the fixing buckle of the second fixing member is fixed to the second connection bracket via rivets or another fastener, the fixing buckle has a folded edge, and the second connection bracket catches a gap between brake discs of a caliper bracket by the folded edge, for fixing the second connection bracket on the automobile caliper.

* * * * *